(12) United States Patent
Falat et al.

(10) Patent No.: US 6,254,303 B1
(45) Date of Patent: Jul. 3, 2001

(54) QUICK-RELEASE CONNECTOR AND METHODS THEREFORE

(76) Inventors: Bogdan S. Falat, 5838 S. Normandy, Chicago, IL (US) 60638; Eugene R. Bozek, 5116 N. Oneida, Norridge, IL (US) 60656

( * ) Notice: Subject to any disclaimer, the term of this patent is extended or adjusted under 35 U.S.C. 154(b) by 0 days.

(21) Appl. No.: 09/243,518

(22) Filed: Feb. 1, 1999

(51) Int. Cl.[7] .................................. B25B 3/22; B25B 3/16
(52) U.S. Cl. .......................... 403/348; 403/325; 403/321; 403/349
(58) Field of Search ..................... 403/348, 349, 403/345, 350, 353, 321, 325, 322.1; 83/698.11, 698.71, 698.91, 699.11, 699.21

(56) References Cited

U.S. PATENT DOCUMENTS

| | | | |
|---|---|---|---|
| 334,919 | * | 1/1886 | Wickizer . |
| 1,130,726 | * | 3/1915 | Greve . |
| 1,171,380 | * | 2/1916 | Arthur . |
| 1,420,639 | * | 6/1922 | Sturgis . |
| 2,617,166 | * | 11/1952 | Kaufmann . |
| 3,736,011 | * | 5/1973 | Ward . |
| 3,858,910 | * | 1/1975 | Oeitker . |
| 4,274,774 | * | 6/1981 | Haga et al. . |
| 5,354,075 | | 10/1994 | Marik et al. . |
| 5,398,946 | | 3/1995 | Quiring . |
| 5,456,095 | | 10/1995 | Tawil . |
| 5,462,311 | * | 10/1995 | Cipolla . |
| 5,464,229 | * | 11/1995 | Salpaka . |
| 5,681,127 | | 10/1997 | Willen . |
| 5,779,383 | | 7/1998 | McCallum . |
| 5,791,808 | | 8/1998 | Nyholm . |
| 5,791,809 | | 8/1998 | Bessey . |

* cited by examiner

Primary Examiner—Lynne H. Browne
Assistant Examiner—Tomlyne A. Malcolm
(74) Attorney, Agent, or Firm—Michael R. McKenna

(57) ABSTRACT

An industrial quick-release connector for machine tools providing both rotational and axial stability that will permit easy replacements by an individual using only one hand without the use of hand tools to make the connection and reduce the time delays that normally ensue.

20 Claims, 5 Drawing Sheets

QUICK-RELEASE CONNECTOR AND METHODS THEREFORE

BACKGROUND OF THE INVENTION

The present invention relates to a connecting device. More particularly to an improved means for connecting a machine tool to the arm of a stationary machine with the connection being without extraneous tools and where the connection is both quick to connect and quick to release and provides rotational and axial stability. The quick release connector of the current invention will permit easy replacement of a malfunctioning tool without the time delays that normally ensue. This novel connector will operate for all manner of connected objects.

Various devices are known in the art for use on single arm or multi-arm machines that require individual power tools or power bits, or other machine tools requiring quick release adaptors so that said machine tools and/or bits can be easily and quickly replaced. It is required that such connected tools be secured both axially and radially with respect to the arm. A machine tool cannot rotate relative to the arm or be moved axially relative thereto during normal operation. This concern is especially important for high speed machine tools requiring both accuracy and safety. Conventional connecting systems require the use of hand tools, and other connecting systems are often more cumbersome requiring multi-sided profiles and recesses, and independent securing keys or special tools, which may at times be unavailable for use, thus delaying the connection process. It is extremely important to utilize machine room time as efficiently as possible, therefore, it is important to eliminate lost time associate with connecting machine tools.

Replacement of a given machine tool, when appropriate procedure for changing out of one tool with another is required, is particularly aided by this device which can have one of its male member and female member attached, respectively, to a guide arm and the other attached to the machine tool. This will allow the operator to quickly connect drills, reamers, and other power equipment without significant time loss.

Alternative technology for connecting machine and other tools and devices to a machine or a stationary object include standard fittings and connectors often requiring hand tools for making the connection.

Many conventional systems for the assembly of two components provide a female part and a male part, as connectors. Prior art, however, does not provide for such members that can interlock both axially and rotationally, in the manner taught by the instant invention. The male member has a base on an end and a cylindrical shaft extending from the base to the other end, with a pair of nubs or lobes protruding radially from opposite sides of the shaft at a predetermined spaced distance from the base. These lobes are arranged to be transversely disposed relative to another radially symmetrical key disposed on the shaft. In cooperation with correspondingly sized and shaped radially symmetrical key passageways on the female member that are aligned radially, the connection between the male member and female member is both axially and radially fixed.

Unlike prior art devices that employ an extended peripheral groove disposed inside of a bore and inclined cam channel which includes an aperture in communication with the bore to receive an axial male member for engagement which will prevent withdrawal of such member, the instant invention provides for easy engagement through insertion and twisting motion to secure the connection both axially and rotationally.

To alleviate this problem, and others which will become apparent from the disclosure which follows, the present invention conveniently disengages by manually pushing back the spring bias collar sufficiently to allow the second key to be free to rotate followed by sufficient rotation to align the first key with the key way of the inner sleeve for axially withdrawal.

These together with other objects of the invention; along with the various features of novelty which characterize the invention are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

Still other advantages will be apparent from the disclosure that follows.

SUMMARY OF THE INVENTION

The invention relates to a quick-release connector and methods of producing same. The present invention provides a quick-release connector comprising a female member, with a receiving end, having an outer collar with an internal recess defined therein, an inner sleeve fitted into the internal recess, and means for biasing the outer collar towards the receiving end relative to the inner sleeve, where the inner sleeve is movable axially relative to the outer collar and has an internal bore therethrough that is coaxial with the internal recess.

The internal recess of the collar has a radially defined keypath of a precalculated axial height disposed proximate to the receiving end with predefined radial dimensions, and a radial bore portion having a uniform radial bore dimension disposed adjacent to the keypath distally from the receiving end. Furthermore, the inner sleeve has an outer contour comprising a radially defined first key of an axial depth that is less than the axial height of the keypath, having a shape corresponding to the keypath with corresponding radial dimensions in all directions that are less by a predetermined amount than the predefined radial dimensions of the keypath to allow the first key to fit into the keypath, and being disposed proximate to the receiving end thereof. In addition, it further comprises a cylindrical sleeve portion disposed adjacent to the first key with a uniform radius that is less by a predetermined amount than the uniform radial bore dimension to allow the cylindrical sleeve portion to fit in the radial bore portion.

The internal bore of the inner sleeve has a radially defined keyway, with a major radial dimension and a minor radial dimension, commencing at the receiving end of the inner sleeve and extending axially away from the receiving end for a predetermined distance, a radial step adjacent to the keyway with a radial step dimension at least as great as the major radial dimension of the keyway, and a cylindrical bore portion is disposed adjacent to the radial step and distally from the receiving end with a radial dimension at least as great as the minor radial dimension of the keyway.

The first key has a predominant radial dimension that lies in a first plane which passes through the axis of the inner sleeve and the major radial dimension of the keyway.

Further included is a male member with a leading end, that is reversibly and coaxially engageable to the female member, having a shaft extending from the leading end, at least one nub, and a second radially defined key disposed at a spaced axial distance from the at least one nub with a radially defined shape corresponding to the first key.

The second key has a predominant radial dimension, which corresponds to a maximum radial dimension of the keypath, that lies in a second plane which passes through the axis of the shaft. The spaced axial distance being at least as great as the predetermined distance of the keyway. The at least one nub protrudes radially from the side of the shaft in a radial direction with a maximum radial nub dimension that is less than the major radial dimension by a predetermined amount to allow the at least one nub to fit through the keyway and with the maximum radial nub dimension being greater than the minor radial dimension by a predetermined amount to allow the at least one nub that has passed through the keyway axially and into a space bounded by the radial step to be rotated relative to the inner sleeve to misalign the keyway and the at least one nub.

The radial direction of the at least one nub lies in a third plane which passes through the axis of the shaft, and a line normal to the second plane is transverse to a line normal to the third plane. Misalignment of the at least one nub with the keyway inhibits axial movement between the male member and the inner sleeve of the female member. Moreover, the rotation of the at least one nub of the male member within the space bounded by the radial step transverse to the keyway may further align the second key with the keypath of the outer collar and the means for biasing may move the keypath into engagement with the second key to inhibit further rotational movement between the male member and the female member.

A preferred method for producing a quick-release connecting of a male member to a female member is also disclosed comprising the following steps:

a. axially receiving a leading portion of a shaft including an irregularly shaped shaft key extending transversely from the shaft of the male member into a keypath of an internal bore of the female member that has a corresponding shape as the irregularly shaped shaft key;

b. axially passing the irregularly shaped shaft key through the keypath;

c. pushing axially against a spring biased outer collar of the female member with a first irregularly shaped key of the male member causing a keyway having a corresponding shape as the first irregularly shaped key to be occupied by a second irregularly shaped key of the female member having a corresponding shape as the first irregularly shaped key;

d. rotating the male member after the irregularly shaped shaft key has axially passed through the keypath to inhibit further axial movement of the male member relative to the female member;

e. further rotating the male member after the irregularly shaped shaft key has axially passed through the keypath until the first irregularly shaped key is aligned with the keyway; and f. releasing the spring biased outer collar causing the keyway to move axially to receive the first irregularly shaped key and to inhibit further rotation of the male member relative to the female member.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Preferred embodiments of the invention are described hereinafter with reference to the accompanying drawing wherein.

DETAILED DESCRIPTION OF THE INVENTION

The preferred embodiments depicted in the drawing include a first and second preferred embodiment of the quick-release connector and method for producing such connection.

Without departing from the generality of the invention disclosed herein, the teachings of the quick-release connector of the present invention could be further applied to all manners and applications where an axially and rotationally fixed connection is required.

The discussion that follows, without limiting the scope of the invention, will refer to the invention as depicted in the drawing, showing an apparatus that will make a quick connection for any commercial or industrial application.

It will be readily understood that for industrial applications, for machine tools and the like, the preferred material of construction is stainless steel or a suitable alloy. However, where the application is less rigorous, a suitable plastic or various other substitute materials may be used.

For applications requiring stainless steel, it is preferred that the radially extensions, including the transverse nubs on the shaft and the keys, be machined from a single metal piece, as this will provide greater strength and connector life.

In a preferred embodiment of the present invention, as shown in the drawing, a quick-release connector 10 comprising a female member 9, with a receiving end 7, having an outer collar 6 with an internal recess 16 defined therein, and an inner sleeve 5 fitted into the internal recess, the inner sleeve 5 is movable axially relative to the outer collar 6 and has an internal bore 14 therethrough that is coaxial with the internal recess 16.

Figure 6:
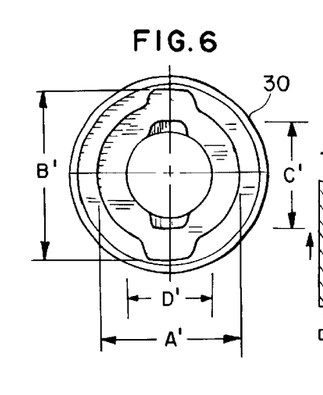
FIG. 6 is a bottom plan schematic view taken along ln. 6—6 of FIG. 5 of the quick-release connector of the present invention showing relationships of the maximum radial dimension (B') and the minimum radial dimension (A') of the keypath.
Figure 7A:
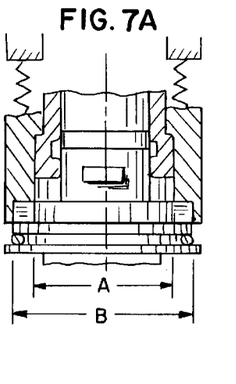
FIGS. 7A–7F are fragmentary sectional schematic views of the quick-release connector of the present invention with some internal parts in full elevation take along designated lines of FIGS. 4B–4G, respectively.
Figure 7B:
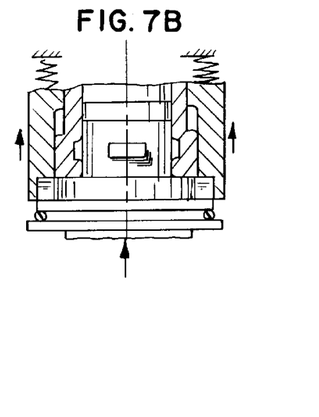
Figure 7C:
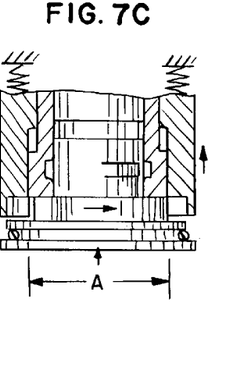
Figure 7D:
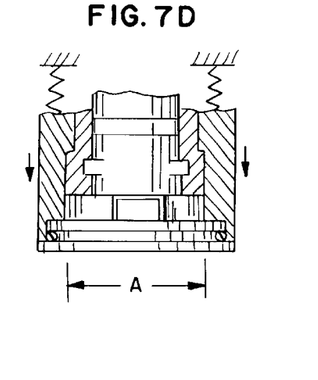
Figure 7E:
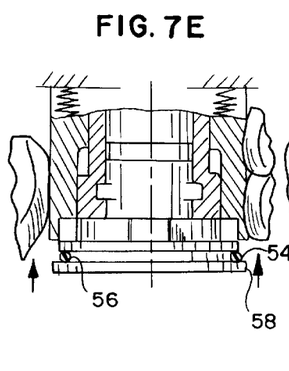
Figure 7F:
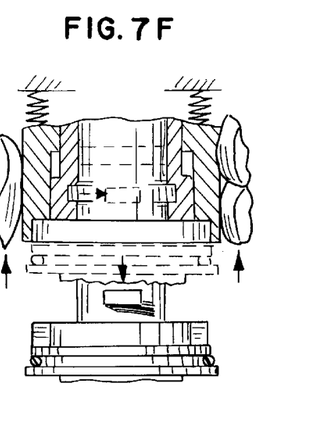

The internal recess 16 of the collar 6 has a radially symmetrical keypath 4 of a precalculated axial height disposed proximate to the receiving end 7 with a maximum radial dimension B' and a minimum radial dimension A', as shown in FIG. 6, and a radial bore portion 18 having a uniform radial bore dimension disposed adjacent to the keypath 4 distally from the receiving end 7. The uniform radial bore dimension is less that the minimum radial dimension A' of the keypath 4 by a predetermined amount.

The inner sleeve 5 has an outer contour comprising a radially symmetrical first key 3 of an axial depth that is less than the axial height of the keypath 4, with a radially defined shape corresponding to the keypath with corresponding radial dimensions that are less by a predetermined amount than the maximum radial dimension B' and the minimum radial dimension A' of the keypath 4 to allow the first key 3 to fit into the keypath 4. The keypath is disposed proximate to the receiving end 7 of the inner sleeve 5.

The inner sleeve 5 further comprises a cylindrical sleeve portion 12 disposed adjacent to the first key 3 with a uniform radius that is less by a predetermined amount than the uniform radial bore dimension to allow the cylindrical sleeve portion 12 to fit in the radial bore portion 18.

The internal bore 14 of the inner sleeve 5 has a radially symmetrical keyway 2, with a major radial dimension C' and a minor radial dimension D', as shown in FIG. 6, commencing at the receiving end 7 of the inner sleeve 5 and extending axially away from the receiving end for a predetermined distance; a radial step 20 with a predetermined thickness adjacent to the keyway 2 with a radial step dimension at least as great as the major radial dimension of the keyway; and a cylindrical bore portion 22 disposed adjacent to the radial step 20 and distally from the receiving end 7 with a radial dimension at least as great as the minor radial dimension of the keyway 2.

Figure 12:
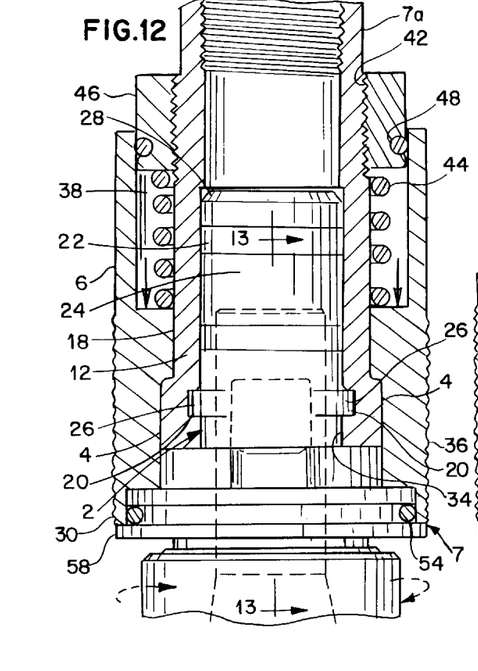
FIG. 12 is a cross-sectional view of the quick-release connector of the present invention with some internal parts in full elevation from the same perspective as FIG. 9 but with the male member having been rotated 90°, as shown in FIG. 11, which allows the major lobes of the second key to be in alignment with the keypath of the inner recess of the collar which allows the spring biasing of the collar to move the collar over said second key, thereby inhibiting further rotational movement between the male member and the female member.

The end 7a of the inner sleeve, opposite the receiving end 7, is preferably internally threaded, as shown in FIG. 12, so that it may be attached to an arm of a machine or the like.

The first key 3 has a predominant radial dimension that lies in a first plane which passes through the axis of the inner sleeve and the major radial dimension of the keyway.

The quick-release connector 10 of the present invention further comprises a male member 8 with a leading end 28, that is reversibly and coaxially engageable to the female member 9. The male member has a shaft 24 extending from the leading end 28, a pair of nubs 26, and a second radially symmetrical key 1 of predetermined axial height to resist rotational movement between the male member and the female member, disposed at a spaced axial distance from the pair of nubs 26 with a radially defined shape corresponding to the first key 3. The spaced axial distance is at least as great as the predetermined distance of the keyway 2.

The second key 1 has a predominant radial dimension, which corresponds to the maximum radial dimension B' of the keypath 4, that lies in a second plane which passes through the axis of the shaft 24.

Each nub 26 protrudes radially from the side of the shaft 24 in an opposite direction with a maximum radial nub dimension that is less than the major radial dimension C' by a predetermined amount to allow the pair of nubs to fit through the keyway 2 and with the maximum radial nub dimension being greater than the minor radial dimension D' by a predetermined amount to allow the pair of nubs 26 that have passed through the keyway 2 axially and into a space bounded by the radial step 20 to be rotated relative to the inner sleeve 5 to misalign the keyway 2 and the pair of nubs 26.

The opposite direction of each of the nubs 26 lie in a third plane which passes through the axis of the shaft 24, and a line normal to the second plane is transverse to a line normal to the third plane.

The misalignment of the pair of nubs 26 with the keyway 2 inhibits axial movement between the male member 8 and the inner sleeve 5 of the female member, and the rotation of the pair of nubs 26 of the male member within the space bounded by the radial step 20 transverse to the keyway 2 may further align the second key 1 with the keypath 4 of the outer collar and the keypath may be moved into engagement with the second key 1 to inhibit further rotational movement between the male member 8 and the female member 9.

In another preferred embodiment of the present invention, a quick-release connector 10 comprises a female member 9, with a receiving end 7, having an outer collar 6 with an internal recess 16 defined therein, an inner sleeve 5 fitted into the internal recess 16, and means for biasing the outer collar 6 towards the receiving end 7 relative to the inner sleeve 5. The inner sleeve is movable axially relative to the outer collar and has an internal bore 14 therethrough that is coaxial with the internal recess 16.

The internal recess 16 of the collar has a radially symmetrical keypath 4 of a precalculated axial height disposed proximate to the receiving end 7 with a maximum radial dimension and a minimum radial dimension, and a radial bore portion 18 having a uniform radial bore dimension disposed adjacent to the keypath 4 distally from the receiving end 7.

The inner sleeve 5 has an outer contour comprising a radially symmetrical first key 3 of an axial depth that is less than the axial height of the keypath 4, having a radially defined shape corresponding to the keypath with corresponding radial dimensions that are less by a predetermined amount than the maximum radial dimension and the minimum radial dimension of the keypath 4 to allow the first key 3 to fit into the keypath 4, and being disposed proximate to the receiving end thereof, and further comprising a cylindrical sleeve portion 22 disposed adjacent to the first key 3 with a uniform radius that is less by a predetermined amount than the uniform radial bore dimension to allow the cylindrical sleeve portion 22 to fit in the radial bore portion 18.

The internal bore 14 of the inner sleeve 5 has a radially symmetrical keyway 2, with a major radial dimension and a minor radial dimension, commencing at the receiving end of the inner sleeve and extending axially away from the receiving end for a predetermined distance, a radial step adjacent to the keyway with a radial step dimension at least as great as the major radial dimension of the keyway, and a cylindrical bore portion is disposed adjacent to the radial step 20 and distally from the receiving end with a radial dimension at least as great as the minor radial dimension of the keyway 2.

The first key 3 has a predominant radial dimension that lies in a first plane which passes through the axis of the inner sleeve 5 and the major radial dimension of the keyway 2.

Further included is a male member 8 with a leading end 28, that is reversibly and coaxially engageable to the female 9 member, having a shaft 24 extending from the leading end, a pair of nubs 26, and a second radially symmetrical key 1 disposed at a spaced axial distance from the pair of nubs 26 with a radially defined shape corresponding to the first key 3. The second key 1 has a predominant radial dimension, which corresponds to the maximum radial dimension of the keypath 4, that lies in a second plane which passes through the axis of the shaft 24. The spaced axial distance being at least as great as the predetermined distance of the keyway 2.

Each nub 26 protrudes radially from the side of the shaft 24 in an opposite direction with a maximum radial nub dimension that is less than the major radial dimension by a predetermined amount to allow the pair of nubs to fit through the keyway and with the maximum radial nub dimension being greater than the minor radial dimension by a predetermined amount to allow the pair of nubs that have passed through the keyway axially and into a space bounded by the radial step to be rotated relative to the inner sleeve to misalign the keyway and the pair of nubs.

The opposite direction of each of the nubs lie in a third plane which passes through the axis of the shaft, and a line normal to the second plane is transverse to a line normal to the third plane. The misalignment of the pair of nubs with the keyway inhibits axial movement between the male member and the inner sleeve of the female member. The rotation of the pair of nubs 26 of the male member within the space bounded by the radial step 20 transverse to the keyway 2 may further align the second key 1 with the keypath 4 of the outer collar and the means for biasing may move the keypath into engagement with the second key to inhibit further rotational movement between the male member and the female member.

Preferably, the outer collar 6 has a full length internal recess 16 defined therein.

In one of its broadest forms, the quick-release connector 10 of this important invention comprises a female member 9, with a receiving end 7, having an outer collar 6 with an internal recess 16 defined therein, an inner sleeve 5 fitted into the internal recess, and means for biasing the outer collar towards the receiving end relative to the inner sleeve. The inner sleeve is movable axially relative to the outer collar and has an internal bore therethrough that is coaxial with the internal recess.

The internal recess 16 of the collar has a radially defined keypath 4 of a precalculated axial height disposed proximate to the receiving end with predefined radial dimensions, and a radial bore portion 18 having a uniform radial bore dimension disposed adjacent to the keypath 4 distally from the receiving end. Furthermore, the inner sleeve has an outer contour comprising a radially defined first key 3 of an axial depth that is less than the axial height of the keypath 4, having a shape corresponding to the keypath with corresponding radial dimensions in all directions that are less by a predetermined amount than the predefined radial dimensions of the keypath to allow the first key to fit into the keypath, and being disposed proximate to the receiving end thereof. In addition, it further comprises a cylindrical sleeve portion 22 disposed adjacent to the first key 3 with a uniform radius that is less by a predetermined amount than the uniform radial bore dimension to allow the cylindrical sleeve portion to fit in the radial bore portion 18.

The internal bore 14 of the inner sleeve has a radially defined keyway 2, with a major radial dimension and a minor radial dimension, commencing at the receiving end of the inner sleeve and extending axially away from the receiving end for a predetermined distance, a radial step 20 adjacent to the keyway 2 with a radial step dimension at least as great as the major radial dimension of the keyway, and a cylindrical bore portion 22 is disposed adjacent to the radial step and distally from the receiving end with a radial dimension at least as great as the minor radial dimension of the keyway. The first key 3 has a predominant radial dimension that lies in a first plane which passes through the axis of the inner sleeve and the major radial dimension of the keyway 2.

Further included is a male member 8 with a leading end 28, that is reversibly and coaxially engageable to the female member 9, having a shaft 24 extending from the leading end, at least one nub 26, and a second radially defined key disposed at a spaced axial distance from the at least one nub with a radially defined shape corresponding to the first key 3.

The second key 1 has a predominant radial dimension, which corresponds to a maximum radial dimension of the keypath, that lies in a second plane which passes through the axis of the shaft 24. The spaced axial distance being at least as great as the predetermined distance of the keyway. The at least one nub 26 protrudes radially from the side of the shaft 24 in a radial direction with a maximum radial nub dimension that is less than the major radial dimension by a predetermined amount to allow the at least one nub to fit through the keyway 2 and with the maximum radial nub dimension being greater than the minor radial dimension by a predetermined amount to allow the at least one nub that has passed through the keyway axially and into a space bounded by the radial step to be rotated relative to the inner sleeve to misalign the keyway and the at least one nub 26.

The radial direction of the at least one nub 26 lies in a third plane which passes through the axis of the shaft 24, and a line normal to the second plane is transverse to a line normal to the third plane. Misalignment of the at least one nub 26 with the keyway 2 inhibits axial movement between the male member 8 and the inner sleeve 5 of the female member. Moreover, the rotation of the at least one nub of the male member within the space bounded by the radial step 20 transverse to the keyway 2 may further align the second key 1 with the keypath 4 of the outer collar and the means for biasing may move the keypath into engagement with the second key to inhibit further rotational movement between the male member and the female member.

Preferably, the internal recess 16 of the collar further comprises a circumferential rim 30 extending from the receiving end 7.

Additionally, the line normal to the second plane is preferably perpendicular to the line normal to the third plane. In this regard, rotation of the at least one nub of the male member a full 90° within the space bounded by the radial step 20 perpendicular to the keyway 2 will align the second key 1 with the keypath 4 of the outer collar 6, as shown in FIGS. 4E, 7D, and 11–13, and the means for biasing may move the keypath 4 into engagement with the second key 1 to inhibit further rotational movement between the male member 8 and the female member 9.

Figure 8:
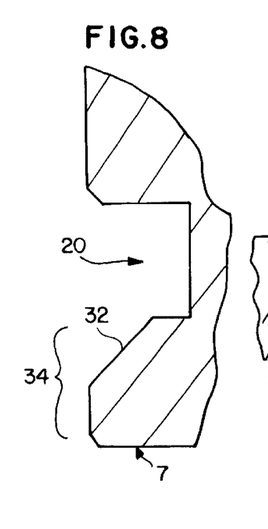
FIG. 8 is a fragmentary cross-sectional schematic view in elevation of the quick-release connector of the present invention showing the keyway and radial step with a beveled sidewall in the keyway taken along the keyway at a minor radial dimension.

In another preferred aspect of the quick-release connector 10, the keyway 2 has a bevel 32 in a side wall 34, as best shown in FIG. 8, extending along at least a portion of its periphery with the minor radial dimension. This aspect may be proximate to the radial step 20. It is readily understood that this aspect of the invention facilitates rotation of the shaft 24 with the at least one nub in the keyway 2.

Furthermore, as shown in FIGS. 1–3, 9 and 12–13, the outer collar 6 may have a knurled exterior surface 36 proximate to the receiving end 7.

Figure 9:
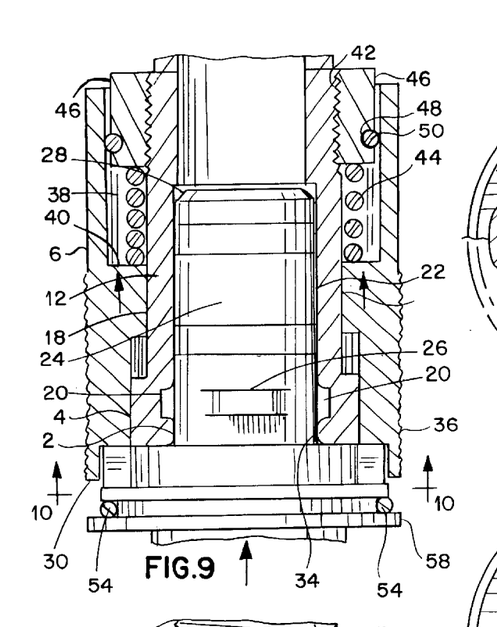
FIG. 9 is a sectional view of the quick-release connector of the present invention with some internal parts in full elevation (from the same perspective as FIGS. 5 and 6) showing the relationship of the elements as the male member, with its nubs aligned with the keyway, being sufficiently inserted for the second key to engage and axially move the outer collar (prior to rotation)
Figure 10:
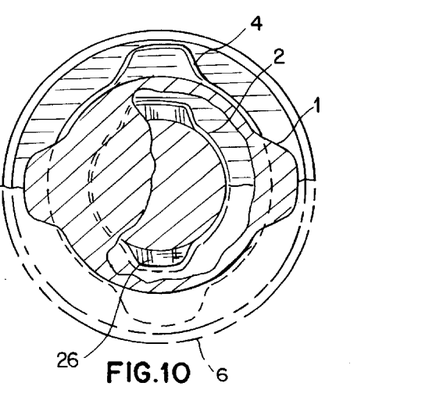
FIG. 10 is a cross-sectional view of the quick-release connector of the present invention taken along the ln. 10—10 of FIG. 9 showing the relationship of the major lobes of the second key (predominant radial dimension) misaligned with the keypath and minor lobe (direction) of the pair of nubs aligned with the keyway.
Figure 11:
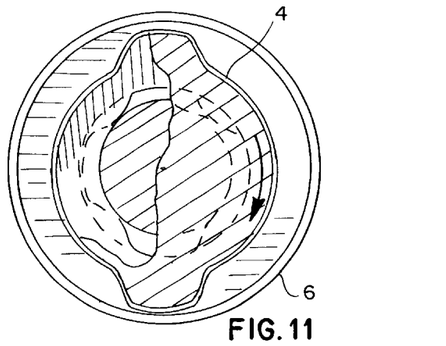
FIG. 11 is a sectional view of the quick-release connector of the present invention similar to that shown in FIG. 10 but with the male member having been rotated 90° to establish alignment between the keypath and the major lobe, and the misalignment of the minor lobe and the keyway.
Figure 13:
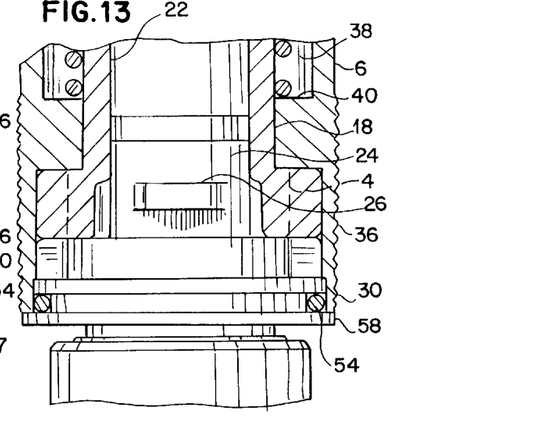
FIG. 13 is a fragmentary cross-sectional view with some internal parts shown in full elevation of the quick-release connector of the present invention taken along the ln. 13—13 of FIG. 12 showing particularly the major radial dimension of the keyway and the maximum radial dimension of the keypath.

Referring now to FIGS. 9 and 12–13, a spring cavity 38 with a radial wall 40 is shown in the internal recess 16 of the outer collar 6. The spring cavity 38 is disposed distally from the receiving end and the radial wall 40 defines the axial boundary of the spring cavity proximate the receiving end, the inner sleeve has a threaded area 42 disposed distally from the receiving end on an exterior surface, and the means for biasing comprises a compression spring 44 disposed between the radial wall 40 of the spring cavity of the outer collar and an internally threaded spring collar 46 threadingly engaged to the threaded area of the inner sleeve.

The means for sealing the compression spring disposed between the outer collar and the internally threaded spring collar may include a circumferentially disposed recess 48 on an exterior surface of the internally threaded spring collar, a spring cavity o-ring 50 to be received by the circumferentially disposed recess 48, the spring cavity o-ring being sized to sealing engage an interior wall of the spring cavity of the outer collar.

As shown in FIGS. 2–3 and 9, 12 and 13, means for sealing the engagement of the male member to the female member is provided comprising the male member having a radially extending base 52 disposed axially adjacent to the second radially defined key 1 and distally away from the leading end, an engagement o-ring 54, and a circumferential rim 58 extending from the receiving end of the internal recess of the collar. The base 52 may have a circumferentially disposed recess 56 on it peripheral surface for receiving and holding the engagement o-ring 54. The engagement o-ring may be received by the circumferentially disposed recess. The engagement o-ring is sized to sealing engage an interior wall of the circumferential rim of the outer collar.

Figure 1:
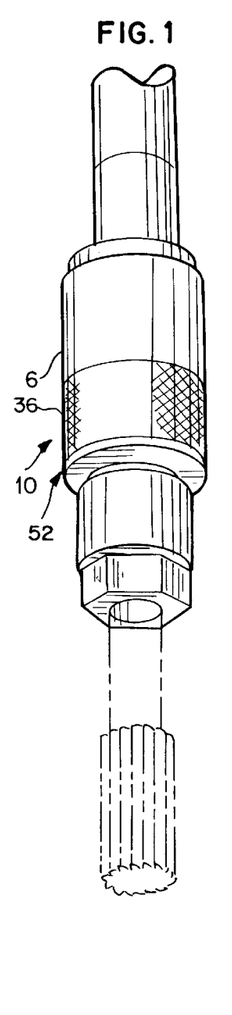
FIG. 1 is a perspective view of the quick-release connector of the present invention with the male member engaged to the female member and with a work piece, shown in phantom, exploded away.
Figure 2:
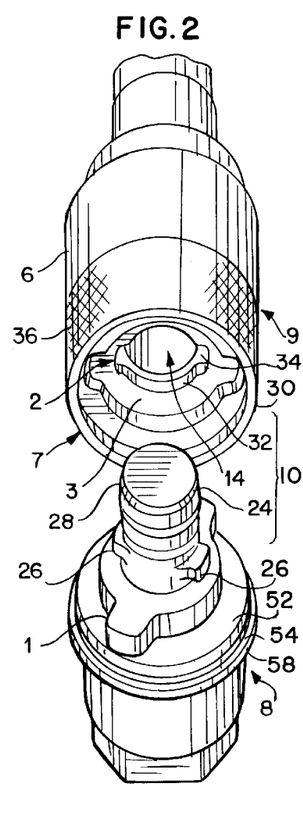
FIG. 2 is a perspective view of the quick-release connector of the present invention with the male member disengaged from the female member.
Figure 3:
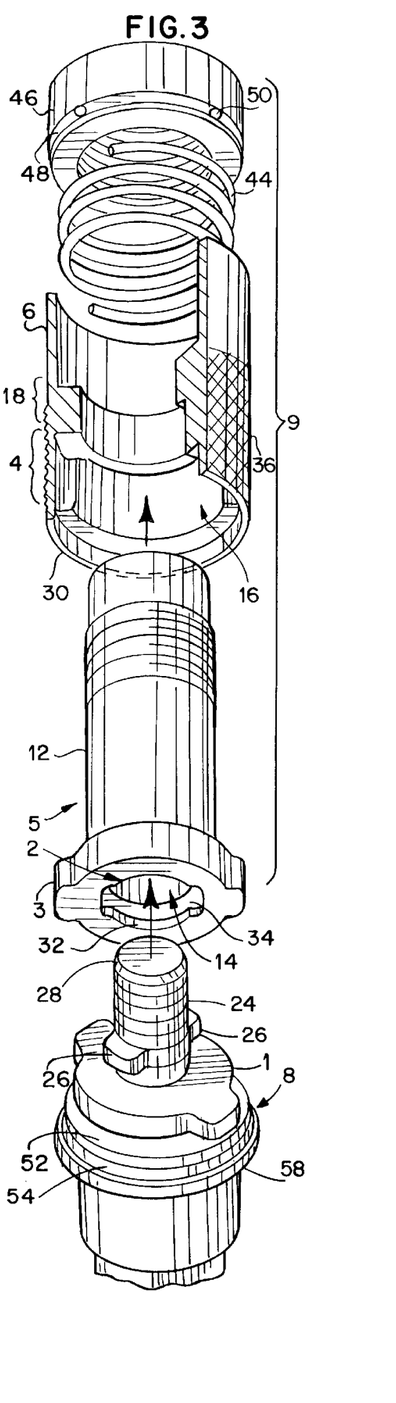
FIG. 3 is an exploded perspective view of the quick-release connector of the present invention with some parts broken away for clarity and showing particularly the internal recess of the collar including a portion of the radially symmetrical keypath and further showing the outer contour of the inner sleeve—particularly the radially symmetrical first keyway disposed at the receiving end of the inner sleeve.
Figure 4A:
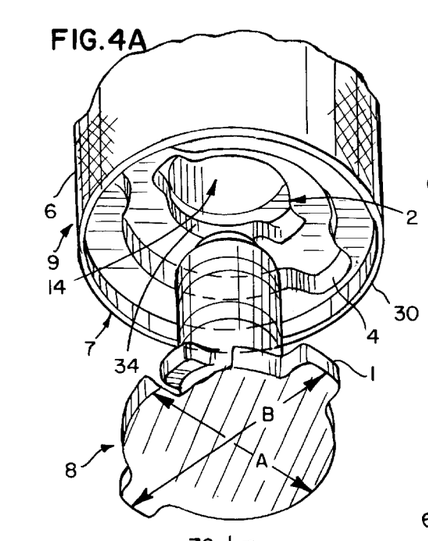
FIGS. 4A–4H are fragmentary perspective schematic views of the quick-release connector of the present invention showing the steps in reversibly engaging the male member to the female member.
Figure 4B:
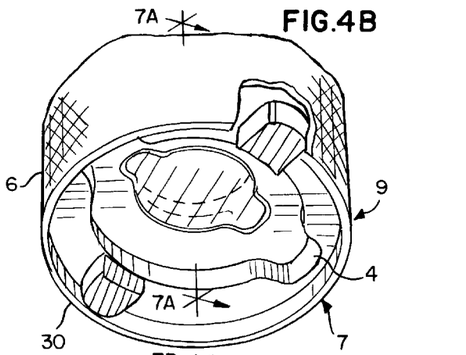
Figure 4C:
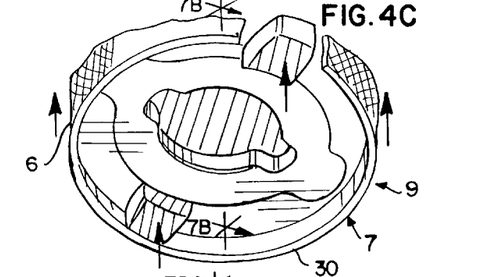
Figure 4D:
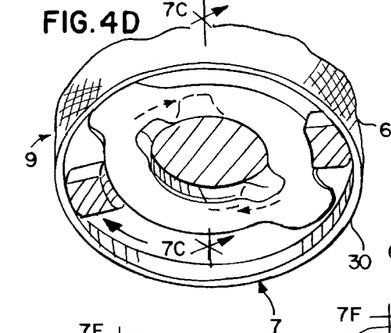
Figure 4E:
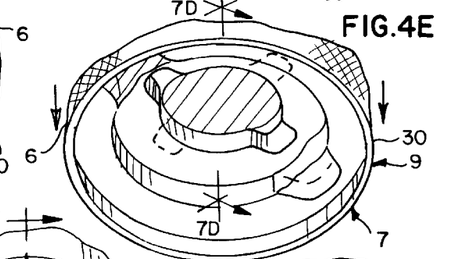
Figure 4F:
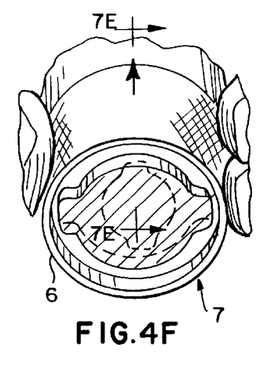
Figure 4G:
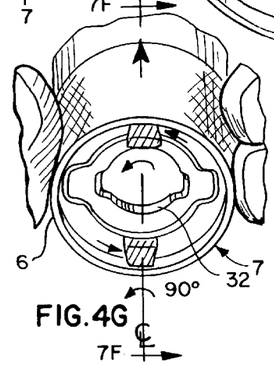
Figure 4H:
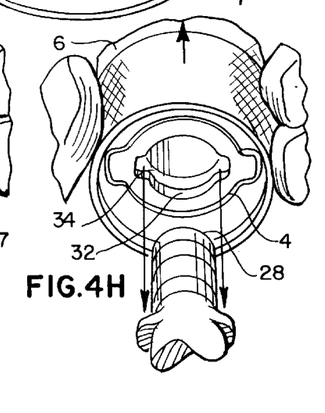
Figure 5:
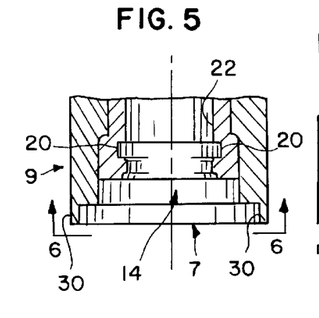
FIG. 5 is a cross-sectional schematic view of the receiving end of the female member shown in elevation showing the relationship of the inner sleeve within the outer collar.
Figure 14:
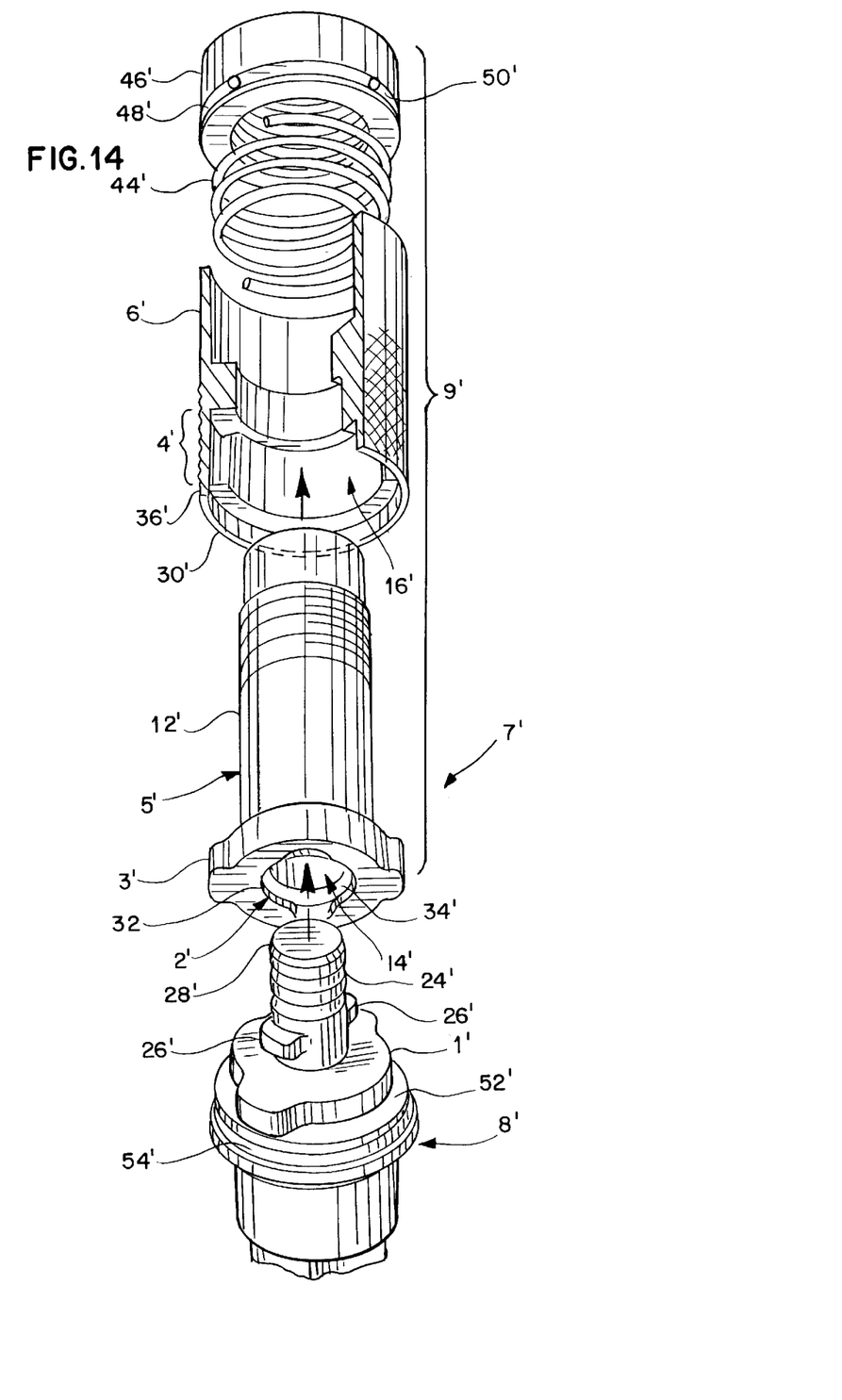
FIG. 14 is an exploded perspective view of a second preferred embodiment of the quick-release connector of the present invention with some parts broken away for clarity and showing particularly the perpendicularity between the direction of the maximum radial dimension of the first key and the direction of the major radial dimension of the keyway of the inner sleeve, and the alignment of the major and minor lobes of the second key and the pair of nubs, respectively, of the male member.

As shown in FIGS. 3 and 14, the inner sleeve is preferably fitted into the internal recess through the receiving end of the outer collar.

In a preferred embodiment of the present invention of the quick-release connector, means for reversibly holding a male member that is axially disposed therein is provided. This means for reversibly holding has means for limiting axial movement and means for inhibiting rotational movement of the male member relative to the means for reversibly holding.

The means for limiting axial movement comprises means for axially receiving a leading portion of a shaft 24 with at least one laterally protruding nub 26 disposed thereon and means for axially retaining the at least one laterally protruding nub when the shaft is partially rotated after having been received by the means for axially receiving. The means for inhibiting rotational movement comprises means for axially accepting an irregularly shaped key 1 extending transversely from the shaft proximate to the leading portion thereof in a keypath 4 having a corresponding shape as the irregularly shaped key 1 after the at least one laterally protruding nub 26 has been retained by the means for axially receiving and means for axially releasing the irregularly shaped key 1 comprising axially withdrawing the keypath 4 from the irregularly shaped key 1 to allow the at least one laterally protruding nub 26 to freely rotate.

In another preferred embodiment of the present invention, as shown in FIG. 14, a the quick-release connector comprises a female member 9', with a receiving end, having an outer collar 6' with an internal recess 16' defined therein, an inner sleeve 5' fitted into the internal recess, and means for biasing the outer collar towards the receiving end 7' relative to the inner sleeve 5'. The inner sleeve is movable axially relative to the outer collar and has an internal bore 14' therethrough that is coaxial with the internal recess, and the internal recess of the collar has a radially symmetrical keypath 4' of a precalculated axial height disposed proximate to the receiving end with a maximum radial dimension and a minimum radial dimension and a radial bore portion having a uniform radial bore dimension disposed adjacent to the keypath distally from the receiving end.

The inner sleeve 5' has an outer contour comprising a radially symmetrical first key 3' of an axial depth that is less than the axial height of the keypath 4', having a radially defined shape corresponding to the keypath with corresponding radial dimensions that are less by a predetermined amount than the maximum radial dimension and the minimum radial dimension of the keypath to allow the first key 3' to fit into the keypath 4', and is disposed proximate to the receiving end thereof, and further comprises a cylindrical sleeve portion 22' disposed adjacent to the first key 3' with a uniform radius that is less by a predetermined amount than the uniform radial bore dimension to allow the cylindrical sleeve portion to fit in the radial bore portion 18'.

Referring to FIG. 14, the internal bore 14' of the inner sleeve 5' has a radially symmetrical keyway 2', with a major radial dimension and a minor radial dimension, commencing at the receiving end of the inner sleeve and extending axially away from the receiving end for a predetermined distance, a radial step 20' adjacent to the keyway with a radial step dimension at least as great as the major radial dimension of the keyway 2', and a cylindrical bore portion 22' is disposed adjacent to the radial step and distally from the receiving end with a radial dimension at least as great as the minor radial dimension of the keyway 2'.

Uniquely, the first key 3' has a predominant radial dimension that lies in a first plane which passes through the axis of the inner sleeve 5' and a second plane passes through the axis of the inner sleeve and the major radial dimension of the keyway 2', and a line normal to the first plane is transverse to a line normal to the second plane.

Also included in this preferred embodiment of the present invention is a male member 8' with a leading end 28', that is reversibly and coaxially engageable to the female member 9', having a shaft 24' extending from the leading end, a pair of nubs 26', and a second radially symmetrical key 1' disposed at a spaced axial distance from the pair of nubs with a radially defined shape corresponding to the first key 3'. The spaced axial distance is at least as great as the predetermined distance of the keyway 2'.

Each nub 26' protrudes radially from the side of the shaft 24' in an opposite direction with a maximum radial nub dimension that is less than the major radial dimension by a predetermined amount to allow the pair of nubs to fit through the keyway 2' and with the maximum radial nub dimension being greater than the minor radial dimension by a predetermined amount to allow the pair of nubs that have passed through the keyway axially and into a space bounded by the radial step 20' to be rotated relative to the inner sleeve to misalign the keyway 2' and the pair of nubs 26'.

The second key 1' has a predominant radial dimension, which corresponds to the maximum radial dimension of the keypath, that lies in a third plane which passes through the axis of the shaft and the opposite direction of each of nub. The arrangement of the key-keyway/keypath is distinct from the earlier embodiment and is shown in FIG. 14. FIGS. 3 and 14 are substantially similar, except for the distinct arrangement of the key-keyway/keypath. For clarity in referring to the embodiment shown in FIG. 14, the reference numbers have been shown primed (').

In another preferred embodiment incorporating the above key-keyway/keypath arrangement, a quick-release connector comprises a female member, with a receiving end, having an outer collar with an internal recess defined therein, an inner sleeve fitted into the internal recess, and means for biasing the outer collar towards the receiving end relative to the inner sleeve. The inner sleeve is movable axially relative to the outer collar and has an internal bore therethrough that is coaxial with the internal recess.

The internal recess of the collar has a radially defined keypath of a precalculated axial height disposed proximate to the receiving end with a maximum radial dimension and a minimum radial dimension, and a radial bore portion having a uniform radial bore dimension disposed adjacent to the keypath distally from the receiving end.

The inner sleeve has an outer contour comprising a radially defined first key of an axial depth that is less than the axial height of the keypath, having a radially defined shape corresponding to the keypath with corresponding radial dimensions that are less by a predetermined amount than the maximum radial dimension and the minimum radial dimension of the keypath to allow the first key to fit into the keypath, and being disposed proximate to the receiving end thereof, and further comprises a cylindrical sleeve portion disposed adjacent to the first key with a uniform radius that is less by a predetermined amount than the uniform radial bore dimension to allow the cylindrical sleeve portion to fit in the radial bore portion.

The internal bore 16' of the inner sleeve of this preferred embodiment has a radially defined keyway 2', with a major radial dimension and a minor radial dimension, commencing at the receiving end of the inner sleeve and extending axially away from the receiving end for a predetermined distance, a radial step adjacent to the keyway with a radial step dimension at least as great as the major radial dimension of the keyway, and a cylindrical bore portion 22' is disposed adjacent to the radial step 20' and distally from the receiving end with a radial dimension at least as great as the minor radial dimension of the keyway 2'.

Again referring to FIG. 14, the first key 3' has a predominant radial dimension that lies in a first plane which passes through the axis of the inner sleeve and a second plane passes through the axis of the inner sleeve and the major radial dimension of the keyway, and a line normal to the first plane is transverse to a line normal to the second plane.

Also included is a male member 8' with a leading end 28', that is reversibly and coaxially engageable to the female member 9', having a shaft extending from the leading end, at least one nub 26', and a second radially defined key 1' of predetermined axial height to resist rotational movement between the male member and the female member, disposed at a spaced axial distance from the at least one nub with a radially defined shape corresponding to the first key 3'.

The spaced axial distance being at least as great as the predetermined distance of the keyway, and the at least one nub protrudes radially from the side of the shaft in a radial direction with a maximum radial nub dimension that is less than the major radial dimension by a predetermined amount to allow the at least one nub to fit through the keyway and with the maximum radial nub dimension being greater than the minor radial dimension by a predetermined amount to allow the at least one nub that has passed through the keyway 2' axially and into a space bounded by the radial step 20' to be rotated relative to the inner sleeve to misalign the keyway and the at least one nub.

The second key 1' has a predominant radial dimension, which corresponds to the maximum radial dimension of the keypath, that lies in a third plane which passes through the axis of the shaft and the radial direction of the at least one nub.

A preferred method for producing a quick-release connecting of a male member to a female member comprises the following steps:

a. axially receiving a leading portion of a shaft including an irregularly shaped shaft key extending transversely from the shaft of the male member into a keypath of an internal bore of the female member that has a corresponding shape as the irregularly shaped shaft key;

b. axially passing the irregularly shaped shaft key through the keypath;

c. pushing axially against a spring biased outer collar of the female member with a first irregularly shaped key of the male member causing a keyway having a corresponding shape as the first irregularly shaped key to be occupied by a second irregularly shaped key of the female member having a corresponding shape as the first irregularly shaped key;

d. rotating the male member after the irregularly shaped shaft key has axially passed through the keypath to inhibit further axial movement of the male member relative to the female member;

e. further rotating the male member after the irregularly shaped shaft key has axially passed through the keypath until the first irregularly shaped key is aligned with the keyway; and f. releasing the spring biased outer collar causing the keyway to move axially to receive the first irregularly shaped key and to inhibit further rotation of the male member relative to the female member.

Another preferred method for producing a quick-release connecting of a male member to a female member comprises the following steps:

a. axially receiving a leading portion of a shaft of the male member into an internal bore of the female member;

b. rotating the male member after the male member has been axially received by the female member until an irregularly shaped shaft key extending transversely from the shaft is aligned with a keypath of the female member having a corresponding shape as the irregularly shaped shaft key;

c. axially passing the irregularly shaped shaft key through the keypath;

d. pushing axially against a spring biased outer collar of the female member with a first irregularly shaped key of the male member causing a keyway having a corresponding shape as the first irregularly shaped key to be occupied by a second irregularly shaped key of the female member having a corresponding shape as the first irregularly shaped key;

e. rotating the male member after the irregularly shaped shaft key has axially passed through the keypath to inhibit further axial movement of the male member relative to the female member;

f. further rotating the male member after the irregularly shaped shaft key has axially passed through the keypath until the first irregularly shaped key is aligned with the keyway; and g. releasing the spring biased outer collar causing the keyway to move axially to receive the first irregularly shaped key and to inhibit further rotation of the male member relative to the female member.

Furthermore, the foregoing method may additionally include the following steps:

a. manually pushing axially against the spring biased outer collar of the female member to release the first irregularly shaped key;

b. rotating the male member to align the irregularly shaped shaft key with the keypath; and c. axially withdrawing the irregularly shaped shaft key through the keypath.

Another method for producing a quick-release connecting of a male member to a female member of the present invention comprises the following sequential steps:

a. axially receiving a leading portion of a shaft of the male member into an internal bore of the female member;

b. rotating the male member after the male member has been axially received by the female member until an irregularly shaped shaft key extending transversely from the shaft is aligned with a keypath of the female member having a corresponding shape as the irregularly shaped shaft key;

c. axially passing the irregularly shaped shaft key through the keypath;

d. pushing axially against a spring biased outer collar of the female member with a first irregularly shaped key of the male member causing a keyway having a corresponding shape as the first irregularly shaped key to be occupied by a second irregularly shaped key of the female member having a corresponding shape as the first irregularly shaped key;

e. rotating the male member after the irregularly shaped shaft key has axially passed through the keypath to inhibit further axial movement of the male member relative to the female member;

f. further rotating the male member after the irregularly shaped shaft key has axially passed through the keypath until the first irregularly shaped key is aligned with the keyway; and g. releasing the spring biased outer collar causing the keyway to move axially to receive the first irregularly shaped key and to inhibit further rotation of the male member relative to the female member.

While this invention has been described in connection with the best mode presently contemplated by the inventor for carrying out his invention, the preferred embodiments described and shown are for purposes of illustration only, and are not to be construed as constituting any limitations of the invention. Modifications will be obvious to those skilled in the art, and all modifications that do not depart from the spirit of the invention are intended to be included within the scope of the appended claims.

The invention resides not in any one of these features per se, but rather in the particular combination of all of them herein disclosed and claimed and it is distinguished from the prior art in this particular combination of all of its structures for the function specified.

For a better understanding of the invention, its operating advantages and the specific objects attained by its uses, reference should be had to the accompanying drawing and descriptive matter in which there is illustrated preferred embodiments of the invention.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is a follows:

1. A quick-release connector comprising:

a. a female member, with a receiving end, having an outer collar with an internal recess defined therein, and an inner sleeve fitted into said internal recess, said inner sleeve is movable axially relative to the outer collar and has an internal bore therethrough that is coaxial with the internal recess, said internal recess of the collar has a radially symmetrical keypath of a precalculated axial height disposed proximate to the receiving end with a maximum radial dimension and a minimum radial dimension, and a radial bore portion having a uniform radial bore dimension disposed adjacent to the keypath distally from the receiving end, said inner sleeve has an outer contour comprising a radially symmetrical first key of an axial depth that is less than the axial height of the keypath, having a radially defined shape corresponding to the keypath with corresponding radial dimensions that are less by a predetermined amount than the maximum radial dimension and the minimum radial dimension of the keypath to allow the first key to fit into the keypath, and being disposed proximate to the receiving end thereof, and further comprising a cylindrical sleeve portion disposed adjacent to the first key with a uniform radius that is less by a predetermined amount than the uniform radial bore dimension to allow the cylindrical sleeve portion to fit in the radial bore portion, said internal bore of the inner sleeve has a radially symmetrical keyway, with a major radial dimension and a minor radial dimension, commencing at the receiving end of the inner sleeve and extending axially away from the receiving end for a predetermined distance, a radial step adjacent to the keyway with a radial step dimension at least as great as the major radial dimension of the keyway, and a cylindrical bore portion is disposed adjacent to the radial step and distally from the receiving end with a radial dimension at least as great as the minor radial dimension of the keyway, said first key has a predominant radial dimension that lies in a first plane which passes through the axis of the inner sleeve and the major radial dimension of the keyway; and b. a male member with a leading end, that is reversibly and coaxially engageable to the female member, having a shaft extending from the leading end, a pair of nubs, and a second radially symmetrical key disposed at a spaced axial distance from the pair of nubs with a radially defined shape corresponding to the first key, said second key has a predominant radial dimension, which corresponds to the maximum radial dimension of the keypath, that lies in a second plane which passes through the axis of the shaft, said spaced axial distance being at least as great as the predetermined distance of the keyway, each nub protrudes radially from the side of the shaft in an opposite direction with a maximum radial nub dimension that is less than the major radial dimension by a predetermined amount to allow the pair of nubs to fit through the keyway and with the maximum radial nub dimension being greater than the minor radial dimension by a predetermined amount to allow the pair of nubs that have passed through the keyway axially and into a space bounded by the radial step to be rotated relative to the inner sleeve to misalign the keyway and the pair of nubs, the opposite direction of each of the nubs lie in a third plane which passes through the axis of the shaft, and a line normal to the second plane is transverse to a line normal to the third plane, whereby, the misalignment of the pair of nubs with the keyway inhibits axial movement between the male member and the inner sleeve of the female member, and whereby, the rotation of the pair of nubs of the male member within the space bounded by the radial step transverse to the keyway may further align the second key with the keypath of the outer collar and the keypath may be moved into engagement with the second key to inhibit further rotational movement between the male member and the female member.

2. A quick-release connector comprising:

a. a female member, with a receiving end, having an outer collar with an internal recess defined therein, an inner sleeve fitted into said internal recess, and means for biasing the outer collar towards the receiving end relative to the inner sleeve, said inner sleeve is movable axially relative to the outer collar and has an internal bore therethrough that is coaxial with the internal recess, said internal recess of the collar has a radially symmetrical keypath of a precalculated axial height disposed proximate to the receiving end with a maximum radial dimension and a minimum radial dimension, and a radial bore portion having a uniform radial bore dimension disposed adjacent to the keypath distally from the receiving end, said inner sleeve has an outer contour comprising a radially symmetrical first key of an axial depth that is less than the axial height of the keypath, having a radially defined shape corresponding to the keypath with corresponding radial dimensions that are less by a predetermined amount than the maximum radial dimension and the minimum radial dimension of the keypath to allow the first key to fit into the keypath, and being disposed proximate to the receiving end thereof, and further comprising a cylindrical sleeve portion disposed adjacent to the first key with a uniform radius that is less by a predetermined amount than the uniform radial bore dimension to allow the cylindrical sleeve portion to fit in the radial bore portion, said internal bore of the inner sleeve has a radially symmetrical keyway, with a major radial dimension and a minor radial dimension, commencing at the receiving end of the inner sleeve and extending axially away from the receiving end for a predetermined distance, a radial step adjacent to the keyway with a radial step dimension at least as great as the major radial dimension of the keyway, and a cylindrical bore portion is disposed adjacent to the radial step and distally from the receiving end with a radial dimension at least as great as the minor radial dimension of the keyway, said first key has a predominant radial dimension that lies in a first plane which passes through the axis of the inner sleeve and the major radial dimension of the keyway; and b. a male member with a leading end, that is reversibly and coaxially engageable to the female member, having a shaft extending from the leading end, a pair of nubs, and a second radially symmetrical key disposed at a spaced axial distance from the pair of nubs with a radially defined shape corresponding to the first key, said second key has a predominant radial dimension, which corresponds to the maximum radial dimension of the keypath, that lies in a second plane which passes through the axis of the shaft, said spaced axial distance being at least as great as the predetermined distance of the keyway, each nub protrudes radially from the side of the shaft in an opposite direction with a maximum radial nub dimension that is less than the major radial dimension by a predetermined amount to allow the pair of nubs to fit through the keyway and with the maximum radial nub dimension being greater than the minor radial dimension by a predetermined amount to allow the pair of nubs that have passed through the keyway axially and into a space bounded by the radial step to be rotated relative to the inner sleeve to misalign the keyway and the pair of nubs, the opposite direction of each of the nubs lie in a third plane which passes through the axis of the shaft, and a line normal to the second plane is transverse to a line normal to the third plane, whereby, the misalignment of the pair of nubs with the keyway inhibits axial movement between the male member and the inner sleeve of the female member, and whereby, the rotation of the pair of nubs of the male member within the space bounded by the radial step transverse to the keyway may further align the second key with the keypath of the outer collar and the means for biasing may move the keypath into engagement with the second key to inhibit further rotational movement between the male member and the female member.

3. The quick-release connector of claim 2, wherein the outer collar has an internal full length recess defined therein.

4. A quick-release connector comprising:

a. a female member, with a receiving end, having an outer collar with an internal recess defined therein, an inner sleeve fitted into said internal recess, and means for biasing the outer collar towards the receiving end relative to the inner sleeve, said inner sleeve is movable axially relative to the outer collar and has an internal bore therethrough that is coaxial with the internal recess, said internal recess of the collar has a radially defined keypath of a precalculated axial height disposed proximate to the receiving end with predefined radial dimensions, and a radial bore portion having a uniform radial bore dimension disposed adjacent to the keypath distally from the receiving end, said inner sleeve has an outer contour comprising a radially defined first key of an axial depth that is less than the axial height of the keypath, having a shape corresponding to the keypath with corresponding radial dimensions in all directions that are less by a predetermined amount than the predefined radial dimensions of the keypath to allow the first key to fit into the keypath, and being disposed proximate to the receiving end thereof, and further comprising a cylindrical sleeve portion disposed adjacent to the first key with a uniform radius that is less by a predetermined amount than the uniform radial bore dimension to allow the cylindrical sleeve portion to fit in the radial bore portion, said internal bore of the inner sleeve has a radially defined keyway, with a major radial dimension and a minor radial dimension, commencing at the receiving end of the inner sleeve and extending axially away from the receiving end for a predetermined distance, a radial step adjacent to the keyway with a radial step dimension at least as great as the major radial dimension of the keyway, and a cylindrical bore portion is disposed adjacent to the radial step and distally from the receiving end with a radial dimension at least as great as the minor radial dimension of the keyway, said first key has a predominant radial dimension that lies in a first plane which passes through the axis of the inner sleeve and the major radial dimension of the keyway; and b. a male member with a leading end, that is reversibly and coaxially engageable to the female member, having a shaft extending from the leading end, at least one nub, and a second radially defined key disposed at a spaced axial distance from the at least one nub with a radially defined shape corresponding to the first key, said second key has a predominant radial dimension, which corresponds to a maximum radial dimension of the keypath, that lies in a second plane which passes through the axis of the shaft, said spaced axial distance being at least as great as the predetermined distance of the keyway, the at least one nub protrudes radially from the side of the shaft in a radial direction with a maximum radial nub dimension that is less than the major radial dimension by a predetermined amount to allow the at least one nub to fit through the keyway and with the maximum radial nub dimension being greater than the minor radial dimension by a predetermined amount to allow the at least one nub that has passed through the keyway axially and into a space bounded by the radial step to be rotated relative to the inner sleeve to misalign the keyway and the at least one nub, the radial direction of the at least one nub lies in a third plane which passes through the axis of the shaft, and a line normal to the second plane is transverse to a line normal to the third plane, whereby, the misalignment of the at least one nub with the keyway inhibits axial movement between the male member and the inner sleeve of the female member, and whereby, the rotation of the at least one nub of the male member within the space bounded by the radial step transverse to the keyway may further align the second key with the keypath of the outer collar and the means for biasing may move the keypath into engagement with the second key to inhibit further rotational movement between the male member and the female member.

5. The quick-release connector of claim 4, wherein the internal recess of the collar further comprises a circumferential rim extending from the receiving end.

6. The quick-release connector of claim 4, wherein the line normal to the second plane is perpendicular to the line normal to the third plane, whereby, rotation of the at least one nub of the male member a full 90° within the space bounded by the radial step perpendicular to the keyway will align the second key with the keypath of the outer collar and the means for biasing may move the keypath into engagement with the second key to inhibit further rotational movement between the male member and the female member.

7. The quick-release connector of claim 4, wherein the keyway has a bevel in a side wall, extending along at least a portion of its periphery with the minor radial dimension, proximate to the radial step, whereby, rotation of the shaft with the at least one nub is facilitated in the keyway.

8. The quick-release connector of claim 4, wherein the outer collar has an exterior surface that is knurled proximate to the receiving end.

9. The quick-release connector of claim 4, wherein the internal recess of the outer collar has a spring cavity with a radial wall, said spring cavity is disposed distally from the receiving end and the radial wall defines the axial boundary of the spring cavity proximate the receiving end, the inner sleeve has a threaded area disposed distally from the receiving end on an exterior surface, and the means for biasing comprises a compression spring disposed between the radial wall of the spring cavity of the outer collar and an internally threaded spring collar threadingly engaged to the threaded area of the inner sleeve.

10. The quick-release connector of claim 9, further comprising means for sealing the compression spring disposed between the outer collar and the internally threaded spring collar including a circumferentially disposed recess on an exterior surface of the internally threaded spring collar, a spring cavity o-ring to be received by said circumferentially disposed recess, said spring cavity o-ring being sized to sealing engage an interior wall of the spring cavity of the outer collar.

11. The quick-release connector of claim 4, further comprising means for sealing the engagement of the male member to the female member.

12. The quick-release connector of claim 11, wherein the means for sealing the engagement of the male member to the female member comprises the male member having a radially extending base disposed axially adjacent to the second radially defined key and distally away from the leading end, an engagement o-ring, and a circumferential rim extending from the receiving end of the internal recess of the collar, said base a circumferentially disposed recess on it peripheral surface for receiving and holding the engagement o-ring, said engagement o-ring to be received by said circumferentially disposed recess, said engagement o-ring being sized to sealing engage an interior wall of the circumferential rim of the outer collar.

13. The quick-release connector of claim 4, wherein the inner sleeve is fitted into the internal recess through the receiving end of the outer collar.

14. A quick-release connector comprising means for reversibly holding a male member that is axially disposed therein, said means for reversibly holding having means for limiting axial movement and means for inhibiting rotational movement of the male member relative to the means for reversibly holding, said means for limiting axial movement comprises means for axially receiving a leading portion of a shaft with at least one laterally protruding nub disposed thereon and means for axially retaining the at least one laterally protruding nub when the shaft is partially rotated after having been received by the means for axially receiving, and said means for inhibiting rotational movement comprises means for axially accepting an irregularly shaped key extending transversely from the shaft proximate to the leading portion thereof in a keypath having a corresponding shape as the irregularly shaped key after the at least one laterally protruding nub has been retained by the means for axially receiving and means for axially releasing the irregularly shaped key comprising axially withdrawing the keypath from the irregularly shaped key to allow the at least one laterally protruding nub to freely rotate.

15. A quick-release connector comprising:

a. a female member, with a receiving end, having an outer collar with an internal recess defined therein, an inner sleeve fitted into said internal recess, and means for biasing the outer collar towards the receiving end relative to the inner sleeve, said inner sleeve is movable axially relative to the outer collar and has an internal bore therethrough that is coaxial with the internal recess, said internal recess of the collar has a radially symmetrical keypath of a precalculated axial height disposed proximate to the receiving end with a maximum radial dimension and a minimum radial dimension, and a radial bore portion having a uniform radial bore dimension disposed adjacent to the keypath distally from the receiving end, said inner sleeve has an outer contour comprising a radially symmetrical first key of an axial depth that is less than the axial height of the keypath, having a radially defined shape corresponding to the keypath with corresponding radial dimensions that are less by a predetermined amount than the maximum radial dimension and the minimum radial dimension of the keypath to allow the first key to fit into the keypath, and being disposed proximate to the receiving end thereof, and further comprising a cylindrical sleeve portion disposed adjacent to the first key with a uniform radius that is less by a predetermined amount than the uniform radial bore dimension to allow the cylindrical sleeve portion to fit in the radial bore portion, said internal bore of the inner sleeve has a radially symmetrical keyway, with a major radial dimension and a minor radial dimension, commencing at the receiving end of the inner sleeve and extending axially away from the receiving end for a predetermined distance, a radial step adjacent to the keyway with a radial step dimension at least as great as the major radial dimension of the keyway, and a cylindrical bore portion is disposed adjacent to the radial step and distally from the receiving end with a radial dimension at least as great as the minor radial dimension of the keyway, said first key has a predominant radial dimension that lies in a first plane which passes through the axis of the inner sleeve and a second plane passes through the axis of the inner sleeve and the major radial dimension of the keyway, and a line normal to the first plane is transverse to a line normal to the second plane; and b. a male member with a leading end, that is reversibly and coaxiaily engageable to the female member, having a shaft extending from the leading end, a pair of nubs, and a second radially symmetrical key disposed at a spaced axial distance from the pair of nubs with a radially defined shape corresponding to the first key, said spaced axial distance being at least as great as the predetermined distance of the keyway, each nub protrudes radially from the side of the shaft in an opposite direction with a maximum radial nub dimension that is less than the major radial nub dimension by a predetermined amount to allow the pair of nubs to fit through the keyway and with the maximum radial nub dimension being greater than the minor radial dimension by a predetermined amount to allow the pair of nubs that have passed through the keyway axially and into a space bounded by the radial step to be rotated relative to the inner sleeve to misalign the keyway and the pair of nubs, said second key has a predominant radial dimension, which corresponds to the maximum radial dimension of the keypath, that lies in a third plane which passes through the axis of the shaft and the opposite direction of each of the nubs, whereby, toe misalignment of the pair of nubs with the keyway inhibits axial movement between the male member and the inner sleeve of the female member, and whereby, the rotation of the pair of nubs of the male member within the space bounded by the radial step transverse to the keyway may further align the second key with the keypath of the outer collar and the means for biasing may move the keypath into engagement with the second key to inhibit further rotational movement between the male member and the female member.

16. A quick-release connector comprising:

a. a female member, with a receiving end, having an outer collar with an internal recess defined therein, an inner sleeve fitted into said internal recess, and means for biasing the outer collar towards the receiving end relative to the inner sleeve, said inner sleeve is movable axially relative to the outer collar and has an internal bore therethrough that is coaxial with the internal recess, said internal recess of the collar has a radially defined keypath of a precalculated axial height disposed proximate to the receiving end with a maximum radial dimension and a minimum radial dimension, and a radial bore portion having a uniform radial bore dimension disposed adjacent to the keypath distally from the receiving end, said inner sleeve has an outer contour comprising a radially defined first key of an axial depth that is less than the axial height of the keypath, having a radially defined shape corresponding to the keypath with corresponding radial dimensions that are less by a predetermined amount than the maximum radial dimension and the minimum radial dimension of the keypath to allow the first key to fit into the keypath, and being disposed proximate to the receiving end thereof, and further comprising a cylindrical sleeve portion disposed adjacent to the first key with a uniform radius that is less by a predetermined amount than the uniform radial bore dimension to allow the cylindrical sleeve portion to fit in the radial bore portion, said internal bore of the inner sleeve has a radially defined keyway, with a major radial dimension and a minor radial dimension, commencing at the receiving end of the inner sleeve and extending axially away from the receiving end for a predetermined distance, a radial step adjacent to the keyway with a radial step dimension at least as great as the major radial dimension of the keyway, and a cylindrical bore portion is disposed adjacent to the radial step and distally from the receiving end with a radial dimension at least as great as the minor radial dimension of the keyway, said first key has a predominant radial dimension that lies in a first plane which passes through the axis of the inner sleeve and a second plane passes through the axis of the inner sleeve and the major radial dimension of the keyway, and a line normal to the first plane is transverse to a line normal to the second plane; and b. a male member with a leading end, that is reversibly and coaxially engageable to the female member, having a shaft extending from the leading end, at least one nub, and a second radially defined key disposed at a spaced axial distance from the at least one nub with a radially defined shape corresponding to the first key, said spaced axial distance being at least as great as the predetermined distance of the keyway, the at least one nub protrudes radially from the side of the shaft in a radial direction with a maximum radial nub dimension that is less than the major radial dimension by a predetermined amount to allow the at least one nub to fit through the keyway and with the maximum radial nub dimension being greater than the minor radial dimension by a predetermined amount to allow the at least one nub that has passed through the keyway axially and into a space bounded by the radial step to be rotated relative to the inner sleeve to misalign the keyway and the at least one nub, said second key has a predominant radial dimension, which corresponds to the maximum radial dimension of the keypath that lies in a third plane which passes through the axis of the shaft and the radial direction of the at least one nub, whereby, other misalignment of the at least one nub with the keyway inhibits axial movement between the male member and the inner sleeve of the female member, and whereby, the rotation of the at least one nub of the male member within the space bounded by the radial step transverse to the keyway may further align the second key with the keypath of the outer collar and the means for biasing may move the keypath into engagement with the second key to inhibit further rotational movement between the male member and the female member.

17. A method for producing a quick-release connecting of a male member to a female member, which comprises the following steps:

a. axially receiving a leading portion of a shaft including an irregularly shaped shaft key extending transversely from the shaft of the male member into a keypath of an internal bore of the female member that has a corresponding shape as the irregularly shaped shaft key;

b. axially passing the irregularly shaped shaft key through the keypath;

c. pushing axially against a spring biased outer collar of the female member with a first irregularly shaped key of the male member causing a keyway having a corresponding shape as the first irregularly shaped key to be occupied by a second irregularly shaped key of the female member having a corresponding shape as the first irregularly shaped hey;

d. rotating the male member after said irregularly shaped shaft key has axially passed through the keypath to inhibit further axial movement of the male member relative to the female member;

e. further rotating the male member after said irregularly shaped shaft key has axially passed through the keypath until the first irregularly shaped key is aligned with the keyway; and f. releasing the spring biased outer collar causing the keyway to move axially to receive the first irregularly shaped key and to inhibit further rotation of the male member relative to the female member.

18. A method for producing a quick-release connecting of a male member to a female member, which comprises the following steps:
   a. axially receiving a leading portion of a shaft of the male member into an internal bore of the female member;
   b. rotating the male member after said male member has been axially received by the female member until an irregularly shaped shaft key extending transversely from the shaft is aligned with a keypath of the female member having a corresponding shape as the irregularly shaped shaft key;
   c. axially passing the irregularly shaped shaft key through the keypath;
   d. pushing axially against a spring biased outer collar of the female member with a first irregularly shaped key of the male member causing a keyway having a corresponding shape as the first irregularly shaped key to be occupied by a second irregularly shaped key of the female member having a corresponding shape as the first irregularly shaped key;
   e. rotating the male member after said irregularly shaped shaft key has axially passed through the keypath to inhibit further axial movement of the male member relative to the female member;
   f. further rotating the male member after said irregularly shaped shaft key has axially passed through the keypath until the first irregularly shaped key is aligned with the keyway; and
   g. releasing the spring biased outer collar causing the keyway to move axially to receive the first irregularly shaped key and to inhibit further rotation of the male member relative to the female member.

19. The method for producing a quick-release connecting of claim 18, further comprising the following steps:
   a. manually pushing axially against the spring biased outer collar of the female member to release the first irregularly shaped key;
   b. rotating the male member to align the irregularly shaped shaft key with the keypath; and
   c. axially withdrawing the irregularly shaped shaft key through the keypath.

20. A method for producing a quick-release connecting of a male member to a female member, which comprises the following sequential steps:
   a. axially receiving a leading portion of a shaft of the male member into an internal bore of the female member;
   b. rotating the male member after said male member has been axially received by the female member until an irregularly shaped shaft key extending transversely from the shaft is aligned with a keypath of the female member having a corresponding shape as the irregularly shaped shaft key;
   c. axially passing the irregularly shaped shaft key through the keypath;
   d. pushing axially against a spring biased outer collar of the female member with a first irregularly shaped key of the male member causing a keyway having a corresponding shape as the first irregularly shaped key to be occupied by a second irregularly shaped key of the female member having a corresponding shape as the first irregularly shaped key;
   e. rotating the male member after said irregularly shaped shaft key has axially passed through the keypath to inhibit further axial movement of the male member relative to the female member;
   f. further rotating the male member after said irregularly shaped shaft key has axially passed through the keypath until the first irregularly shaped key is aligned with the keyway; and
   g. releasing the spring biased outer collar causing the keyway to move axially to receive the first irregularly shaped key and to inhibit further rotation of the male member relative to the female member.

* * * * *

UNITED STATES PATENT AND TRADEMARK OFFICE
Certificate

Patent No. 6,254,303 B1

Patented: July 3, 2001

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Bogdan S. Falat, Chicago, IL; Eugene R. Bozek, Norridge, IL; and Mark A. Bozek, Addison, IL.

Signed and Sealed this Twelfth Day of April 2005.

LYNNE H. BROWNE
*Supervisory Patent Examiner*
Art Unit 3629